United States Patent
Søntvedt et al.

(10) Patent No.: US 6,277,286 B1
(45) Date of Patent: Aug. 21, 2001

(54) METHOD AND DEVICE FOR THE SEPARATION OF A FLUID IN A WELL

(75) Inventors: Terje Søntvedt, Gjettum; Per Eivind Gramme, Porsgrunn; Hielke Kamps, Spikkestad; Per Magne Almdahl, Oslo, all of (NO)

(73) Assignee: Norsk Hydro ASA, Oslo (NO)

( * ) Notice: Subject to any disclaimer, the term of this patent is extended or adjusted under 35 U.S.C. 154(b) by 0 days.

(21) Appl. No.: 09/381,200

(22) PCT Filed: Mar. 18, 1998

(86) PCT No.: PCT/NO98/00085

§ 371 Date: Nov. 15, 1999

§ 102(e) Date: Nov. 15, 1999

(87) PCT Pub. No.: WO98/41304

PCT Pub. Date: Sep. 24, 1998

(30) Foreign Application Priority Data

Mar. 19, 1997 (NO) ............................. 971290
May 28, 1997 (NO) ............................. 972439

(51) Int. Cl.[7] .................................. B01D 17/02
(52) U.S. Cl. .................. 210/744; 166/250; 166/267; 166/105.1; 166/357; 210/747; 210/787; 210/801; 210/804; 210/104; 210/109; 210/115; 210/170; 210/521
(58) Field of Search .............. 96/184, 186; 166/250, 166/265, 267, 105.1, 357; 210/649, 744, 787, 799, 800, 801, 804, 96.1, 104, 109, 115, 143, 747, 170, 167, 195.1, 513, 521, 522

(56) References Cited

U.S. PATENT DOCUMENTS

| | | | |
|---|---|---|---|
| 2,728,457 | * | 12/1955 | Clarke .................. 210/800 |
| 2,873,032 | * | 2/1959 | Henry .................. 210/524 |
| 3,468,421 | * | 9/1969 | Hazel et al. ............ 210/96.1 |
| 3,660,285 | * | 5/1972 | Markel ................. 210/800 |
| 3,893,918 | * | 7/1975 | Favret, Jr. ............. 210/104 |
| 4,014,791 | * | 3/1977 | Tuttle .................. 210/114 |
| 4,116,275 | * | 9/1978 | Butler et al. ........... 166/303 |
| 4,233,154 | | 11/1980 | Presley ................ 210/800 |
| 4,241,787 | | 12/1980 | Price .................. 166/105 |
| 4,619,771 | * | 10/1986 | Stall et al. ............. 210/788 |
| 4,790,947 | * | 12/1988 | Arnold ................ 210/801 |
| 5,225,084 | * | 7/1993 | Assmann et al. ........ 210/649 |
| 5,232,475 | * | 8/1993 | Jepson ................. 166/357 |
| 5,695,655 | * | 12/1997 | Smati .................. 210/800 |
| 5,762,149 | * | 6/1998 | Donovan et al. ........ 166/313 |
| 5,771,973 | * | 6/1998 | Jensen et al. .......... 166/303 |
| 5,837,152 | * | 11/1998 | Komistek et al. ....... 210/801 |
| 6,039,121 | * | 3/2000 | Kisman ................ 166/369 |
| 6,056,054 | * | 5/2000 | Brady et al. ........... 166/265 |
| 6,082,452 | * | 7/2000 | Shaw et al. .......... 166/105.5 |
| 6,138,757 | * | 10/2000 | Latos et al. ........... 166/265 |
| 6,189,613 | * | 2/2001 | Chachula et al. ....... 166/265 |

FOREIGN PATENT DOCUMENTS

| | | |
|---|---|---|
| 544054 | 2/1932 | (DE) . |
| 0359592 | 3/1990 | (EP) . |
| 172426 | 4/1993 | (NO) . |

* cited by examiner

*Primary Examiner*—Peter A. Hruskoci
(74) *Attorney, Agent, or Firm*—Wenderoth, Lind & Ponack L.L.P.

(57) ABSTRACT

A method and device for separating a fluid from a formation into several fluid components in a well is disclosed. The method and device include feeding the fluid into a mainly horizontal section of pipe located in a down-hole, mainly horizontal section of the well, such that the fluid is set to flow at a speed through a length of the mainly horizontal section of pipe such that the fluid components are separated and a boundary layer is formed between the fluid components. The fluid components with a lower density are formed in a top part of the mainly horizontal section of pipe and fluid components with a higher density are formed in a bottom part of the mainly horizontal section of pipe. The fluid components with the lower density and the fluid components with the higher density are removed through separate outlets of the mainly horizontal section of pipe.

23 Claims, 9 Drawing Sheets

METHOD AND DEVICE FOR THE SEPARATION OF A FLUID IN A WELL

BACKGROUND OF THE INVENTION

The present invention relates to a method and device for separation of a fluid comprising several fluid components, especially separation of a well fluid in connection with a pipe for production of hydrocarbons/water.

It has previously be proposed that well fluids in vertical wells should be handled using separators. Such separators can comprise semi-permeable filters which are only pervious to water as described in U.S. Pat. No. 4,241,787 or cyclones as described in NO 172426.

A disadvantage with these devices is that they are relatively complicated in their construction and/or have many moving parts. Moreover, the aforementioned solutions would require extensive maintenance/inspection when used in wells having high pressure and high temperature. Another factor is that these solutions are specially adapted for installation in vertical sections of wells. They would also result in extra pressure loss and consume energy.

SUMMARY OF THE INVENTION

The above disadvantages can be avoided with the present invention. The invention has been specially developed to be able to separate fluids in horizontal sections of wells, something which is very advantageous in the recovery of horizontal formations where the well is formed by means of horizontal drilling for example.

Other advantages to be achieved when using the invention in connection with long (horizontal) wells in particular are:

- less pressure loss owing to reduced transport of water together with hydrocarbons
- simpler (and smaller) downstream equipment for separation
- the amount of water with chemicals released at sea can be greatly reduced
- no salt deposition in production equipment downstream of the well
- minimization of hydrates problem
- minimization of corrosion problems in transport pipes and process equipment (can lead to use of cheaper materials)
- separation of oil/water in the well can lead to simplifications owing to large drops, lack of stabilizing surfactants high temperature and low viscosity
- good capacity in relation to energy consumption and investments

BRIEF DESCRIPTION OF THE DRAWINGS

In the following the invention will be described further by means of examples and figures in which:

FIGS. 8 a)–c) show a third embodiment of a separator with different flow patterns; and FIGS. 9 a)–c) show a fourth embodiment of a separator.

DETAILED DESCRIPTION OF THE INVENTION

Figure 1:
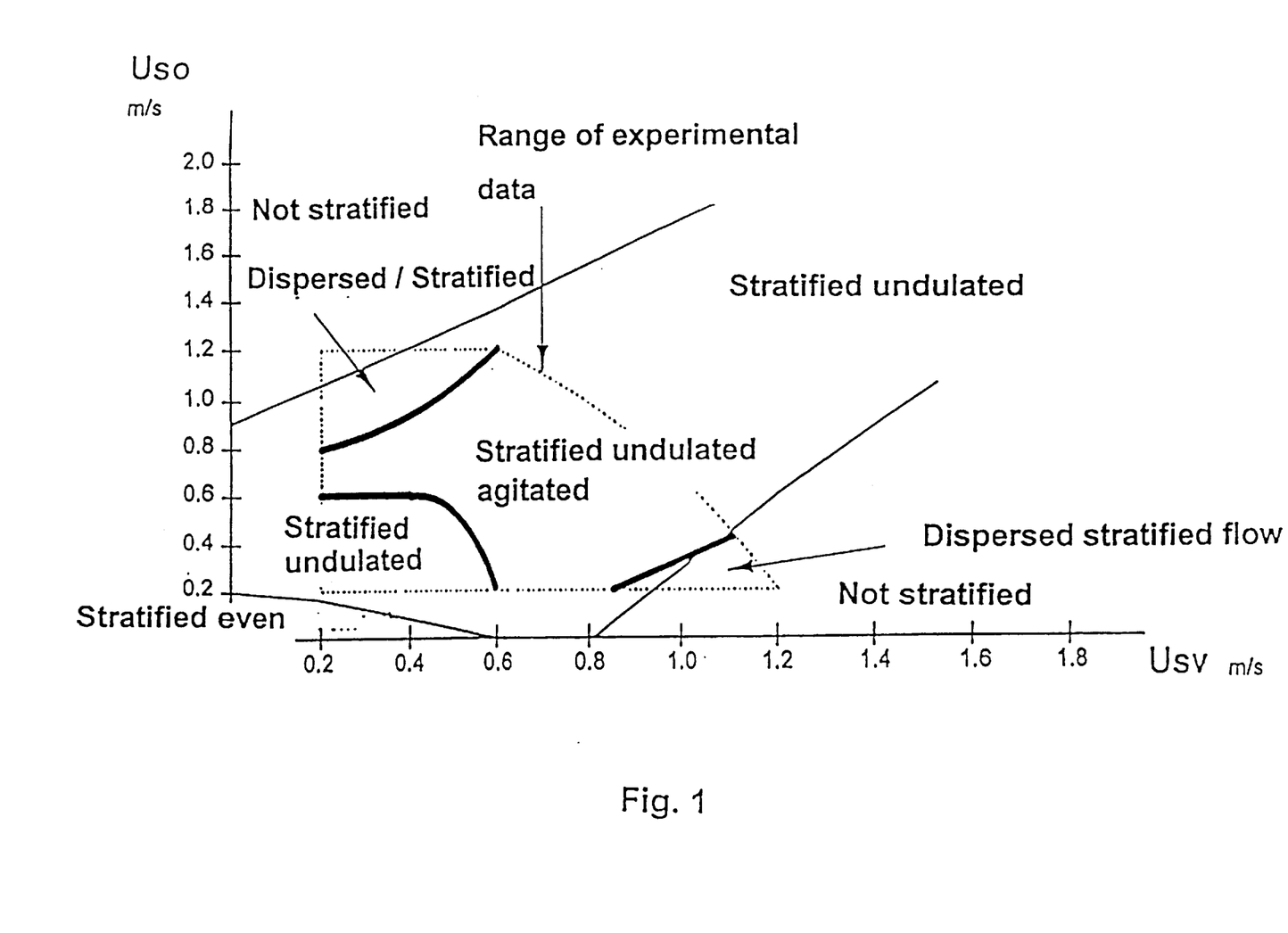
FIG. 1 shows an oil/water flow pattern diagram.

FIG. 1 is a diagram which shows the flow in a fluid comprising an oil component and a water component in relation to the speed of the individual component. As the figure shows it has been established by means of experiments that it is possible to achieve a stratified flow if the speed of flow of the components is of an order of magnitude of less than 0.6 metres per second.

Figure 2:
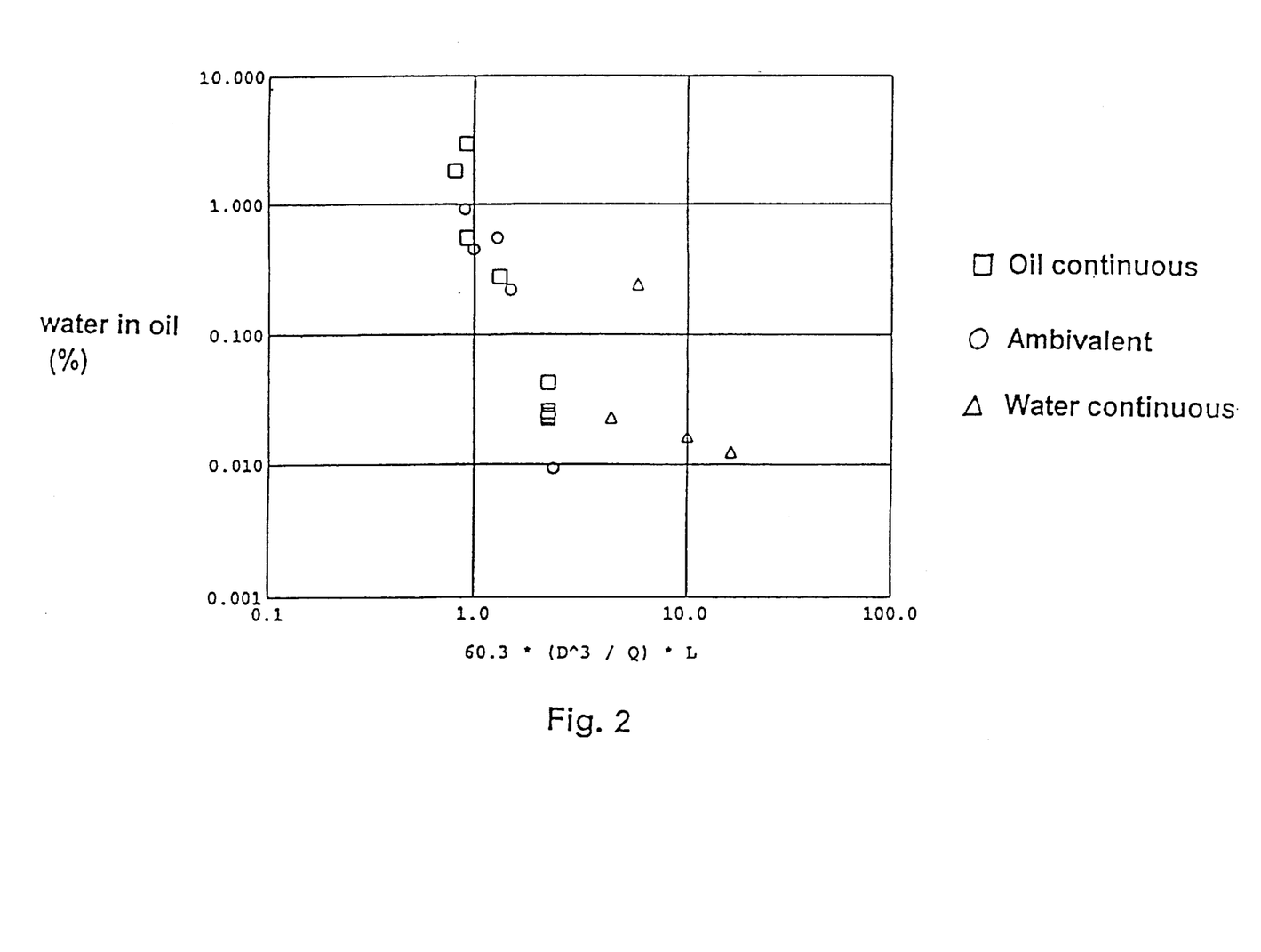
FIG. 2 shows separation in a well separator as a function of separator length, (%) content of water in the product oil.

FIG. 2 is a diagram which shows the results arrived at in experiments carried out in a test rig using a light crude oil quality from a field in the North Sea. The fluid essentially consisted of the fluid components oil and water. A dispersed flow with a speed of $V_{mix}$ 0.6 m/s was initiated in the rig. The tests were carried out to find out what criteria have to be satisfied to achieve the desired degree of separation.

Other parameters were as follows:

System pressure: 105 bar

System temperature: 70° C.

Oil viscosity: 1.02 mPa*S

Oil density: 736 kg/m$^3$

A separator consisting of a horizontal pipe with an inside diameter of D=0.78 m was installed in the rig.

The x-axis in the diagram is represented by a parameter as follows:

$$60.3*(D^3/Q)*L$$

where:

D=inside diameter of the separator pipe (metres)

Q=total volume flow of the well fluid (cubic metres/hour)

L=length of separator pipe

The above parameters include the total retention time for the fluid and a correction factor for varying head (sedimentation distance) at a constant retention time for the fluid, depending on different values for the inside diameter of the pipe.

The y-axis of the diagram indicates the percentage quantity of water in the oil phase.

Figure 3:
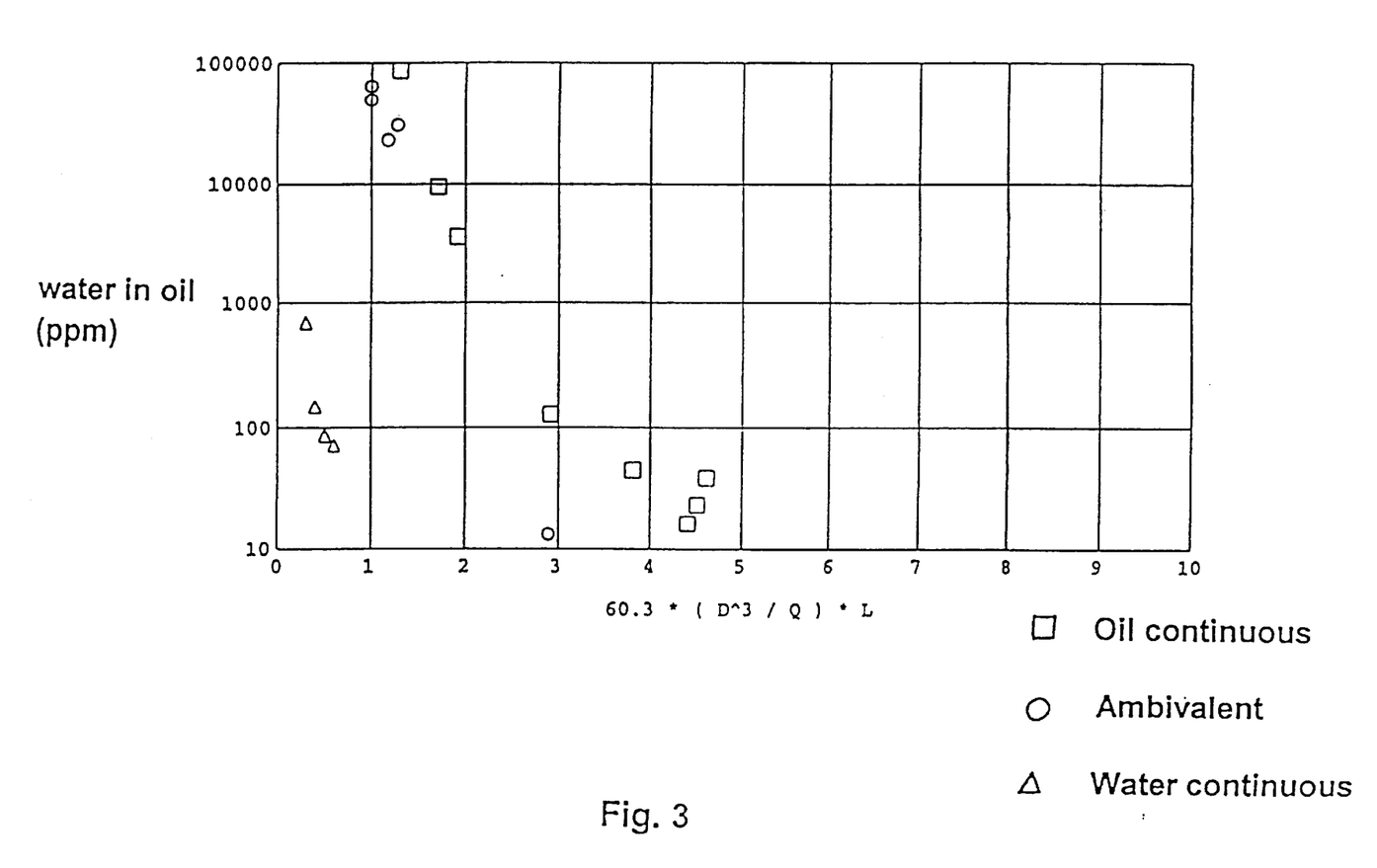
FIG. 3 shows separation in a well separator as a function of separator length, (ppm) content of oil in the product water.

The diagram in FIG. 3 was produced by means of the experiment described above. The y-axis of this diagram indicates the quantity of oil in the water phase in parts per million (ppm), while the x-axis is the same as in FIG. 2.

It should be noted that the results set out in the diagrams in FIGS. 2 and 3 are based on experiments carried out using a specific well fluid and basically only apply to that fluid. Other well fluids would have similar separation properties, however, which could therefore be determined by means of similar experiments. As well fluids can have different emulsion stability properties, they would require a shorter or longer retention time in the separator until equivalent separation was achieved.

Based on the above experiments it is now possible to separate a well fluid in horizontal wells or wells with horizontal sections of sufficient length. When a well fluid flows from a reservoir and in through perforations in a pipe in a well, the well fluid will assume a dispersed flow. Downstream in the production pipe, particularly in sections which are essentially horizontal, the fluid components can assume a stratified flow if the speed of flow of the well fluid is low enough and the retention time is long enough. In the following practical solutions will be described for separation of such a flow based on the above knowledge.

Figure 4:
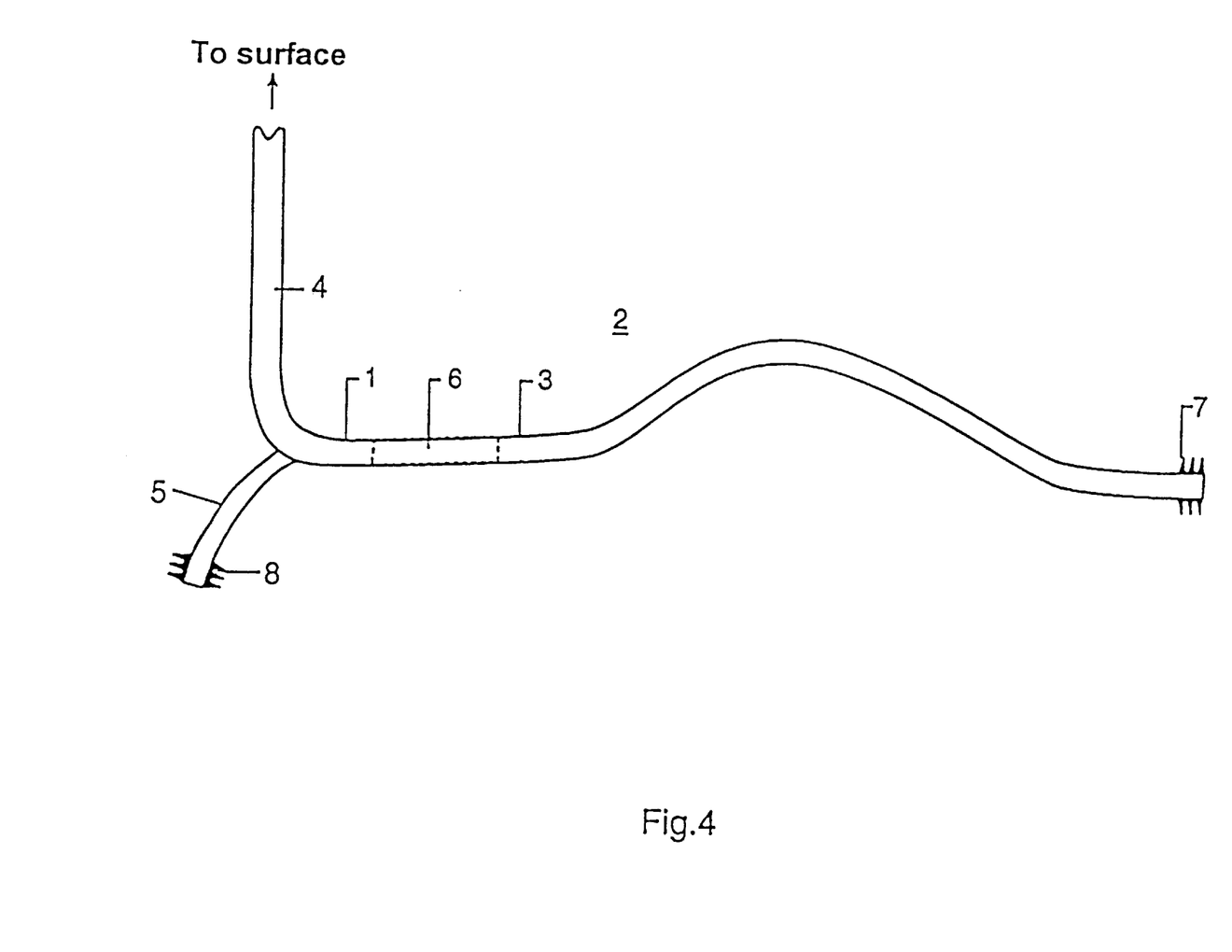
FIG. 4 shows a well with production equipment and a separator.

FIG. 4 shows the principal elements in a supplementary solution for recovery of a formation 2. A pipe is placed in a horizontal section of a well in the formation 2. The pipe 1 comprises a horizontal transport pipe or separation 3 in which there is a separator 6. Upstream of the separator the pipe 1 is attached to drainage elements or perforations 7 which permit well fluid to flow in. Downstream of the separator the pipe 1 comprises a vertical riser 4. The pipe 1 can also be attached to a water injection pipe 5 with injection apertures 8 for injection of separated water into the formation.

Figure 5:
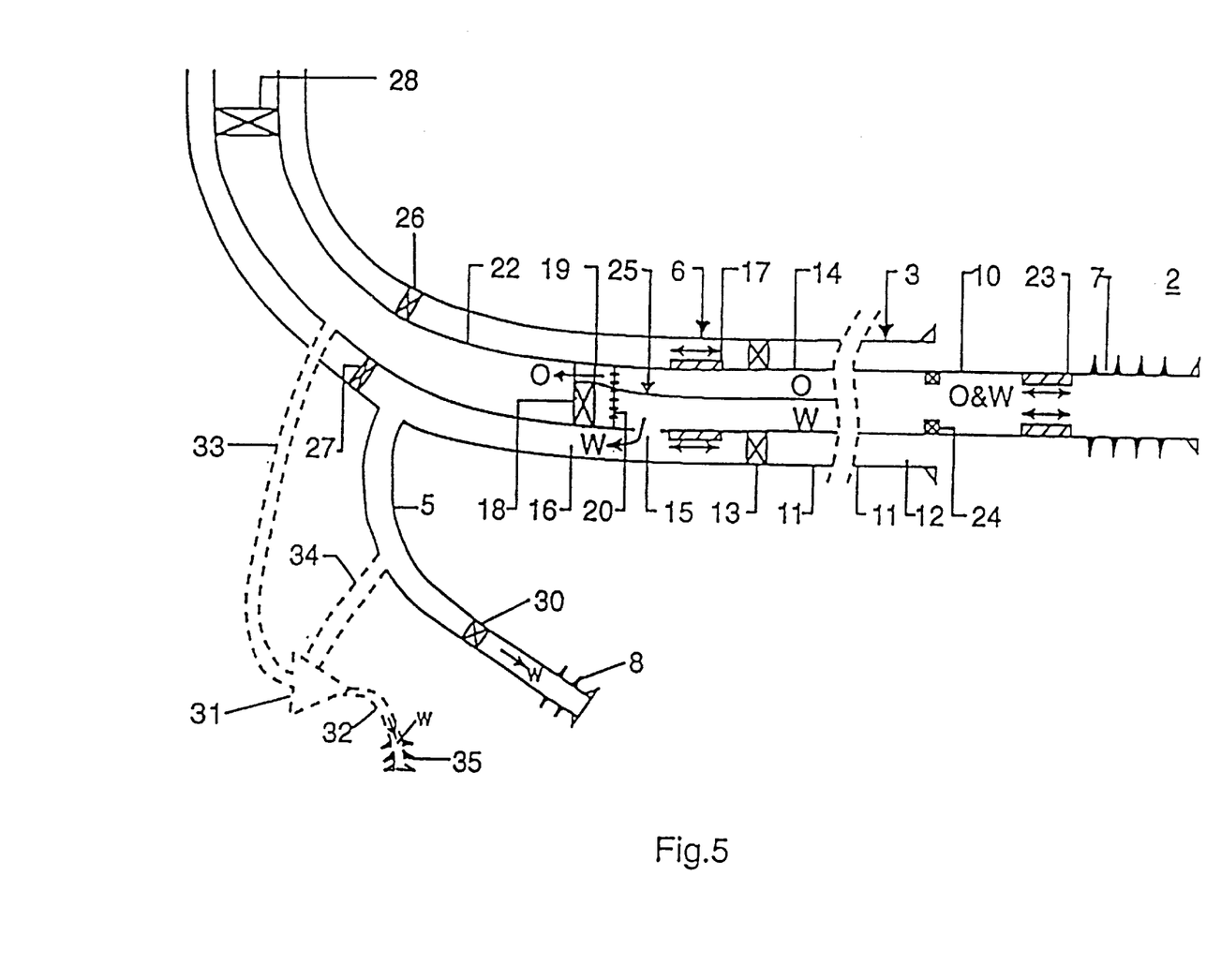
FIG. 5 shows an embodiment of a separator.

FIG. 5 shows an enlarged/detailed section of a supplementary solution as illustrated in FIG. 4. At its upstream end the horizontal transport pipe 3 is attached to an extension pipe 10 with perforations 7 for drainage of the formation 2. Well fluid is fed into the extension pipe 10 and flows in the direction of the separator. The extension pipe can be surrounded by a casing 11 in such a way that an annulus 12 is formed between these pipes. The annulus is closed off towards the separator 6 by means of a packing 13 and if necessary cement. If necessary the extension pipe 10 can be replaced with any type of supplementary solution over one or more reservoir sections.

The separator as illustrated in this example is a pipe-shaped body or section of pipe 14 which has one or more drainage apertures 15 at its downstream end to allow water to drain out of the separator 6. The drainage apertures are chiefly positioned in the bottom part of the section of pipe 14. The pipe-shaped body can with advantage be surrounded by the casing 11 so that water which drains out of the section of pipe 14 through the aperture(s) 15 will be collected in an annulus 16 formed between the section of pipe 14 and the casing 11. If necessary the drainage apertures 15 can be adjustable by means of one or more movable sleeves 17 which can cover/uncover the apertures. The sleeves can be positioned inside the pipe 15 or surround it as shown in the figure. The section of pipe 14 can with advantage be an extension of a production pipe 22.

The annulus 16 can be closed off with a packing 26 in the downstream direction and connected to a water injection pipe 5 for returning water to the formation 2. If necessary the injection pipe can be connected to equipment such as a valve 30, pumps etc. (not shown) so as to achieve a controlled return of water to the reservoir. If desirable the water injection pipe can be connected via a pipe 34 to equipment 31 such as a cyclone for further separation of the water flow. The separated water can then be fed back to the reservoir via a pipe 32 with injection apertures 35, while oil containing water is fed back to the production pipe 22 via pipe 33.

Alternatively the packing 26 can comprise a valve 27 which can be opened and which permits water to be fed to the surface via the annulus 16 between the production pipe and the casing. If necessary, just a small flow of water can be fed up to the surface in this way, or by using a separate pipe (not shown), for sampling and measuring the oil content of the water.

At its downstream end the separator 6 comprises a blocking device 18 which closes off the cross-section of the section of pipe 14 with the exception of one or more apertures 19 in the top of the blocking device. The aperture(s) 19 permit(s) oil to flow from the separator to the production pipe 22. Upstream of the blocking device there is a gamma densiometer 20 which comprises sensors connected to a signal-processing unit (not shown) which makes it possible to establish the level of the boundary layer (level in vertical direction) between the fluid components. This type of multilevel gamma radiation can be used to both detect the level and measure the concentration profile. Moreover, the phase boundary can be established and the oil in the water and water in the oil determined. This type of registration system represents technology of which the specialist is master and will therefore not be described in detail here.

Depending on the purity of the water to be separated out from the well fluid, the boundary layer 25 is regulated high enough in the pipe 14 for a small percentage of water to be fed into the production pipe 22 together with the oil if necessary. Regulation of the boundary layer, including achievement of a constant boundary layer at the desired place in the separator, can be carried out by controlling the outflows from the separator. This can for example be achieved by means of a valve 28 in the production pipe or at the wellhead (not shown) which controls the amount of fluid taken out through the production pipe 22 and regulation of the amount of drained water using the sleeve(s) 17 and/or valve 30 in the water injection pipe 5. The level of the boundary layer can therefore be raised or lowered in the section of pipe 14 by means of reciprocal regulation of the quantity of separated fluids. It should be understood that this regulation can be carried out using a data-processing unit (not shown) which processes the signals registered by the gamma densiometer, processes them in accordance with a set procedure or software and passes signals to admission devices (not shown) which are connected to the aforementioned valves for regulation of the separated fluids. This represents technology of which the specialist is master and will therefore neither not be described in detail here.

Another system for regulating the vertical level of the interface 25 between the fluid components is to measure the quantity of water in the oil (WIO) and the oil flow (Q oil). These quantities are measured downstream of the separator and can with advantage take the form of continuous measurements. The measuring equipment can either be located down in the well, on a platform or on the surface. Using this information the water in the oil can be plotted as a function of oil flow. As long as the oil/water boundary layer in the separator is lower that the oil outlet, the gradient of water in the oil in relation to the oil flow will be low. If the boundary layer approaches the oil outlet, the water in the oil will rise sharply as the oil flow increases. This information can easily be used to control the oil flow in such a way that the separator just barely allows water into the oil outlet.

Alternatively the oil in the water (OiW) can be registered and used to control the level of the boundary layer. This registration can be done at the surface by a small sub-flow of the water which is separated in the separator being taken up to the surface for analysis/measurement of the oil content.

If the speed of the well fluid is too high before it enters the separator, with the result that the conditions for separation cannot be achieved, the speed can be reduced in several ways. The speed of the well fluid upstream of the separator can for example be reduced by decreasing the amount of the fluids extracted at the wellhead and injection pipe.

Alternatively the speed of the well fluid can be regulated by limiting the inflow through the drainage elements or perforations. This can for example be done by closing off the perforations completely or partly using one or more movable sleeves 23. Another method can be to install one or more restrictions in the extension pipe 10 or in another suitable place upstream of the separator. The restriction(s) will help to limit the speed of the well fluid before it reaches the separator. Such restrictions can be bodies which are inserted in the pipe and exhibit a reduction in flow area. Disc-shaped restrictions (plugs with a passage for fluid) can be used for example.

Figure 6:
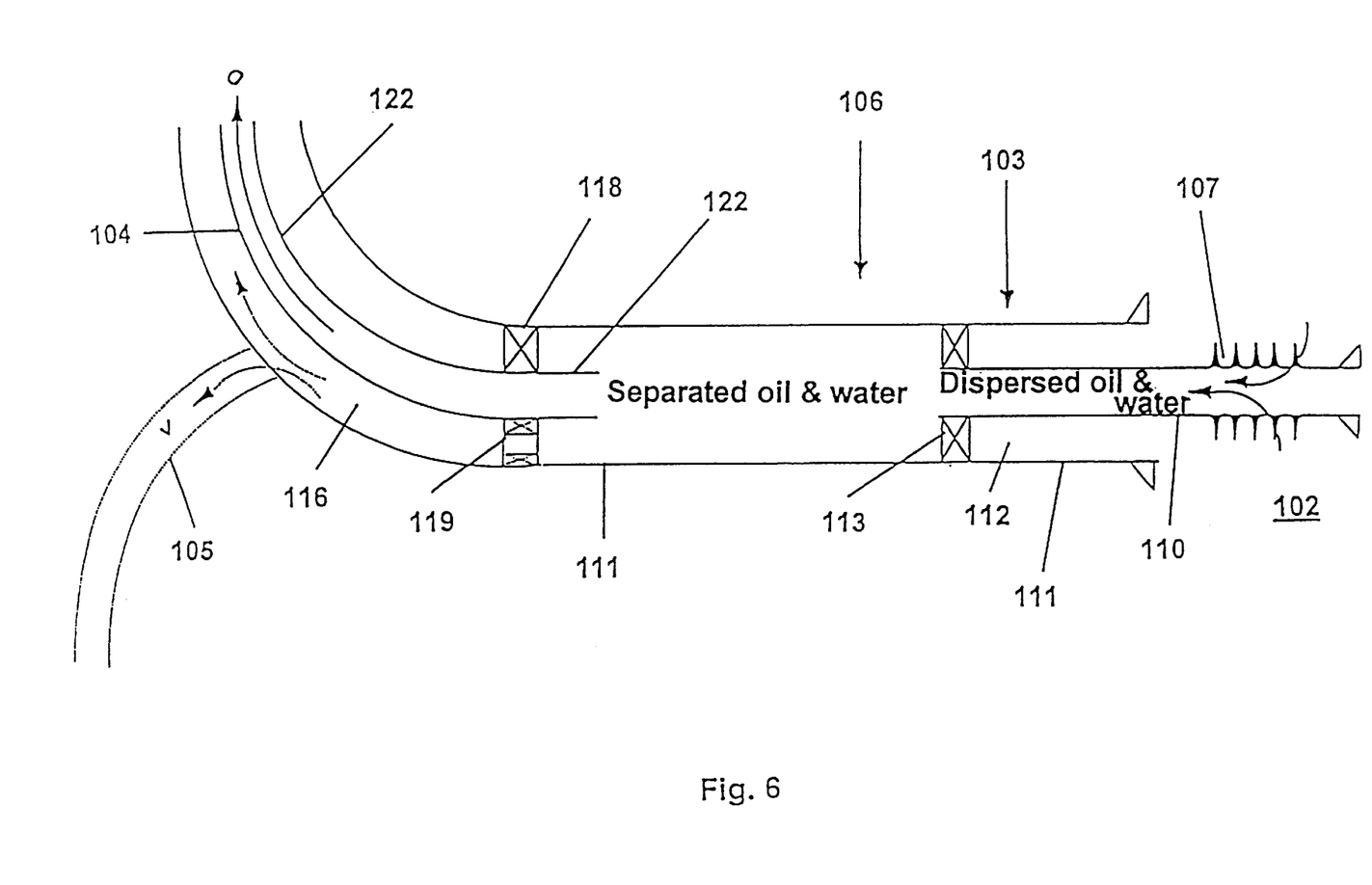
FIG. 6 shows a second embodiment of a separator.

FIG. 6 relates to another embodiment of a separator 106 and shows a detailed cross-section through a separator in a supplementary system as shown in FIG. 4. As in the previous example the horizontal transport pipe 103 is connected at its upstream end to an extension pipe 110 with perforations 107 for draining the formation 102. Well fluid is fed into the extension pipe 110 and flows in the direction of the separator 106. The extension pipe is surrounded by a casing 111 in such a way that an annulus 112 is formed between these pipes. The annulus is closed off towards the separator 106 by means of a packing 113 and if necessary cement. In this embodiment the extension pipe is closed off at the inlet end of the separator. The extension pipe 110 can if necessary be replaced with any type of supplementary solution over one or more reservoir sections.

The separator as shown in this example is a pipe-shaped body or section of pipe which represents an expansion in relation to the flow area in the extension pipe 110. The section of pipe can with advantage be the casing 111. If the diameter of the separator is expanded as shown in this embodiment, the length of the separator can be reduced.

At the outlet end of the separator there is a production pipe 122 which is surrounded by the casing 111. The annulus 116 formed between these pipes is sealed with a packing 118 which has one or more apertures 119 in its bottom part to allow water from the separator to flow through. The water can follow the annulus between the production pipe 122 and the casing 111 either to the surface or to a water injection pipe 105. Oil is fed out of the separator by means of the production pipe 122. The production pipe can project into the inside of the separator with advantage.

It should be understood that the arrangement described under FIG. 5 for regulation of the boundary layer between the fluid components and regulation of the speed of the well fluid can of course also be implemented in this solution. The same applies to what was described regarding the systems for injection and further separation of the water component.

Figure 7:
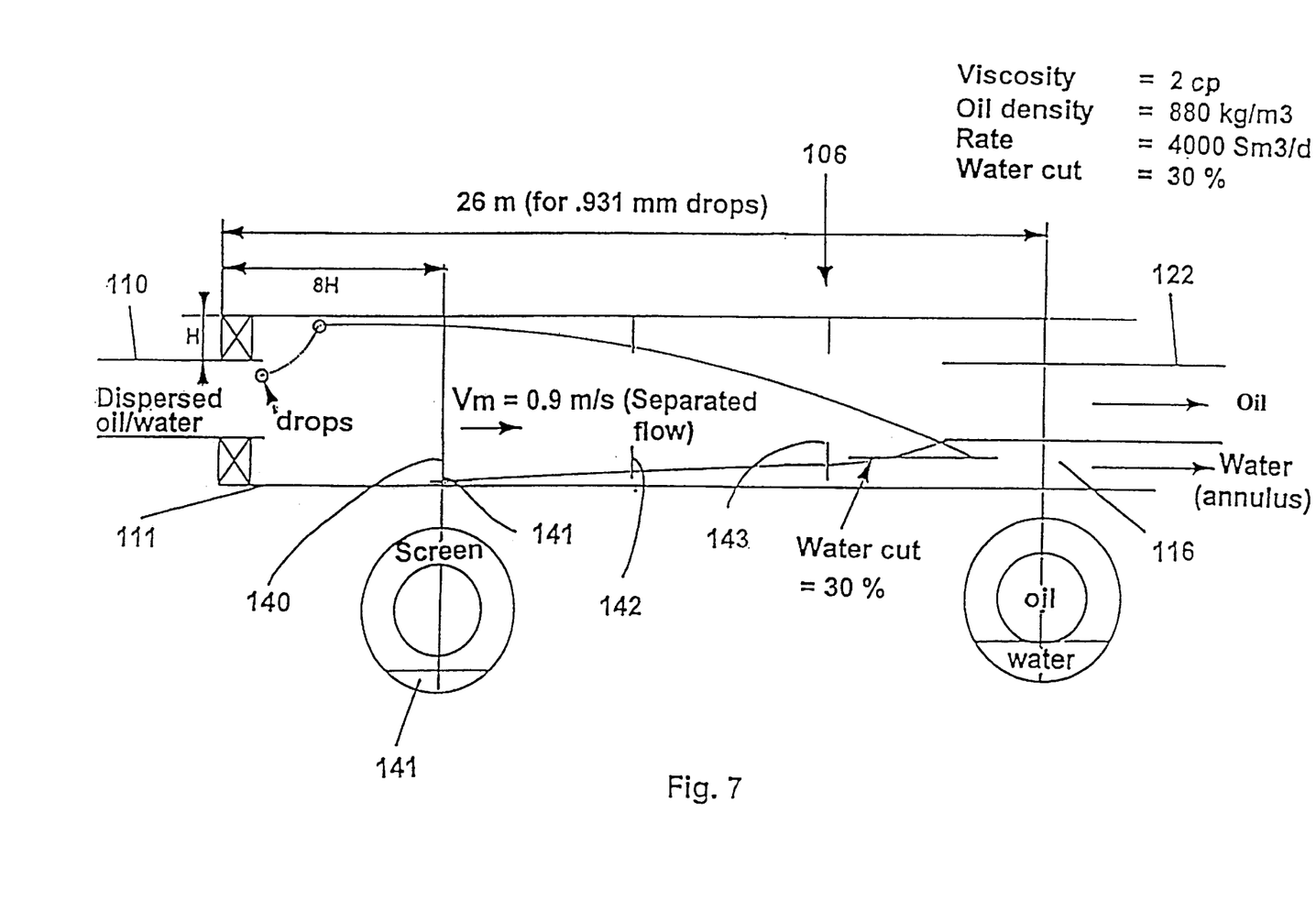
FIG. 7 shows a flow diagram for a separator of the type shown in FIG. 6.

FIG. 7 shows a flow diagram for a separator 106 of the type illustrated in FIG. 6, in which the dispersed oil/water flows into the separator from an extension pipe 110. This example uses a 7" extension pipe and a 10¾" casing 111 as the outer pipe of the separator. The height of the annulus is specified by the length H (distance between extension pipe and casing).

In this example there is at the distance 8H a coalescence-promoting insert or screen 140 which is a pierced disk with a cut in its bottom part. When the disc is inserted in the separator the aforementioned cut will form an aperture 141 which will permit the heaviest fluid components to flow through. The separator can comprise additional screens 142, 143 inserted downstream of the first screen. Such inserts or screens can be used to promote separation in such a way that the speed of the fluid to be separated can be increased in relation to what has been stated above. As the diagram shows, drops (oil) will coalesce and float up in the top part of the separator. With a speed of 0.9 m/s in the separated flow and a separator length of 26 m the flow will be layered towards the separator outlet (production pipe inlet) in such a way that the oil flows into the production pipe 122 and the water enters the annulus 116. The other parameters for the flow illustrated in the diagram are viscosity 2 cp, oil density 880 kg/m$^3$, rate 4000 Sm$^3$/d, water cut 30%.

Figure 8:
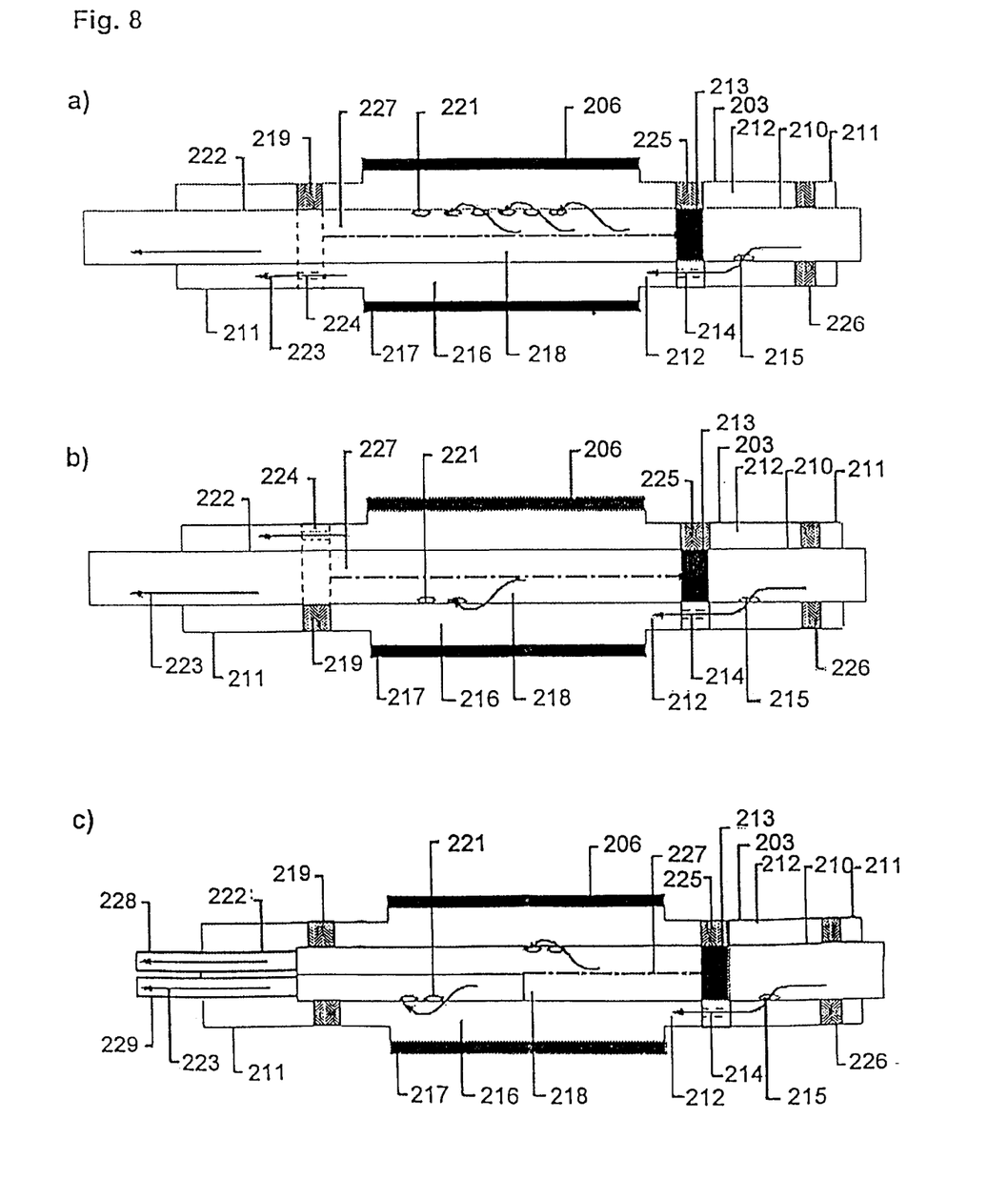

FIG. 8a) relates to a third embodiment of a separator 206 and shows a detailed cross-section through a separator in a supplementary system as described in FIG. 4. This embodiment has a number of structural similarities with the preceding examples, but has a diameter which may be larger than that permitted by the diameter of the casing.

The horizontal transport pipe 203 comprises an extension pipe 210 and a casing 211. Between these two pipes there is an annulus 212 which can if necessary be separated from the reservoir using a packing 226. On the upstream side of the separator there is a plug 213 which closes off the extension pipe 210. If necessary a packing 225 can be fitted in the annulus 212 in such a way that it covers the entire area of the annulus with the exception of one or more apertures 214 in the bottom part of the annulus for example. Upstream of the plug 213 the extension pipe has one or more apertures 215 in its bottom part for example which permit well fluid being transported in the extension pipe 210 to flow out into the annulus 212. The fluid passes through the apertures 214 in the packing 225 and the flows into the separator 206.

The separator as illustrated here is a radial expansion of the outside dimension of the transport pipe 203, but as in the previous example the outside dimension can if necessary be the same as the outside dimension of the casing. The separator comprises an annulus 216 formed between a perforated pipe 218 and a section of pipe 217 which can be an expanded well hole supported by or closed off by means of an expandable pipe, a material hardened in situ or a consolidated formation (not shown in detail). Such pipes can be installed in accordance with inherently known techniques. The perforated pipe 218 can be supported at its upstream end by the extension pipe 210. At its downstream end, the perforated pipe is connected to a production pipe 222. Alternatively the extension pipe, perforated pipe and production pipe can be a continuous pipe with the specified apertures 215, 221 and plug 213.

The annulus of the separator 216 is equipped to communicate with the annulus 212 at its upstream end and with an annulus 223 formed between the production pipe 222 and the casing 211 at its downstream end.

Well fluid which flows into the annulus 216 will be separated in that fluid components with the lowest density (oil and possibly gas) will push up into the top part of the annulus. Here the perforated pipe 218 is equipped with outlets or apertures 221 which allow the fluid components to advance into the pipe and flow on downstream of the production pipe 222. Fluid components with a higher density such as water will be collected in the bottom part of the annulus. The annulus communicates downstream with annulus 223 and the heavier fluid components will therefore be carried away from the separator in this annulus.

A packing 219 is fitted in the annulus 223 downstream of the separator. The packing covers the entire area of the annulus with the exception of one or more apertures 224 in the bottom of the packing. The apertures allow the heavier, separated fluid components to flow through.

It should be understood that the arrangement described under FIG. 5 for regulation of the boundary layer between the fluid components and regulation of the speed of the well fluid can of course also be implemented in this solution. The same applies to what was described regarding the systems for injection and further separation of the water component.

The apertures 221 in the perforated pipe 218 can with advantage be designed with the regulation system which is to regulate the level of the boundary layer in mind, so that control of the outflows from the separator are as even as possible. This can be achieved by the apertures being slit-shaped in the vertical direction or triangular with one corner pointing down (not shown) so that an increase in the level of the boundary layer 227 will produce a limited/progressive increase of water in the oil which is taken out through the apertures 221.

FIG. 8b) shows the same solution as is shown in FIG. 8a), but with another flow pattern where apertures 221 are provided on the lower side or the pipe 218 such that the heaviest fluid components, i.e. the water flows into the pipe and further up through the production pipe 222, while the lighter components flows up through the annulus 223.

FIG. 8c) shows a further flow pattern, where the pipe 218 is provided with apertures on the upper as well as the lower side of the pipe, and whereby the lighter fluid components will flow into the pipe and into the upper side, while the heavier components will enter into the pipe 218 at its lower side. For inside the pipe 218 is provided two separate pipes or channels 228,229 for further separate transport of the two respective fluid components.

Figure 9:
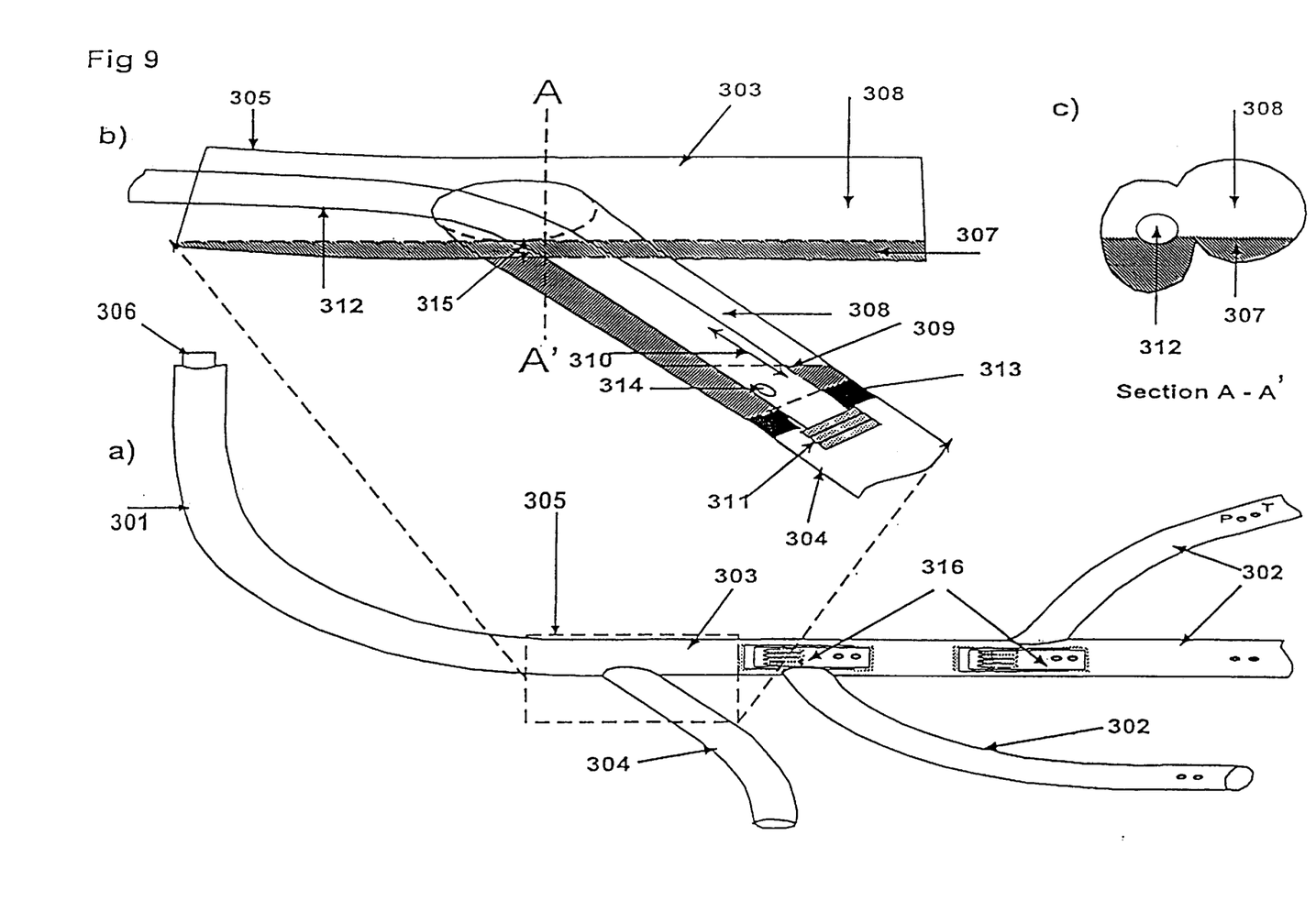

FIGS. 9a)–c) show a fourth embodiment of a separator according to the invention. Moreover, FIG. 9a) shows a part of a well system 301 with drainage pipe and branch pipes 302 and a separator 305 with a water injection well 304, FIG. 9b) shows in enlarged scale part of the well shown in FIG. 9a), and FIG. 9c) shows a section along line A—A in FIG. 9b).

As is shown in the Figures, the separator includes a transport pipe 303 with a joint injection well pipe 304. Oil and/or gas mixed with water flows via inflow restriction devices 316 from the drainage pipe and branch pipes 302 to the transport pipe 303 in the separator 305. Here the water and oil is separated with an upper 308 and lower 307 layer respectively. Preferably, a threshold 315 may be provided in the area where the transport pipe 303 and injection pipe 304 interconnect. Such threshold will secure water being present at a certain level.

The water flows further to the water injection pipe 304, while the oil flows upwards to the production pipe 306. The water flowing into the water injection pipe 304, will contain oil which will be separated in the upper part of the pipe (oil/water interface at 309). A level control 310 (not further shown) detects the oil level and controls a pump 311 which injects the water down into the injection pipe 304. The level control may a capacity type or a combination of capacity and conductivity type control.

It should be emphasized that the drawings are just giving an indication of the different dimensions and distances being used in connection with any practical solution of the invention. Thus, for instance the distance between the transport pipe 303 and the control 310, and the distance between the transport pipe and the pump may be of 50 to 100 metres or more.

The pump 311 as shown in the FIG. 9b) is preferably provided at the end of a completion string 312, close below a packing 313 which separates the separator 305 from the lower part of the injection well pipe. The completion string contains (not shown) electric or hydraulic lines for the supply of energy to the pump.

Besides, the completion string is provided with apertures 314 on the upper side of the packing 313 so that the water being injected to the injection well may flow through these apertures, further through the string 312 and to the pump 311.

The invention is not limited to the above examples. Thus, it may also be relevant to use coalescence-promoting chemicals in connection with the separator. This may be relevant where surfactants are present (e.g. asphalt particles which cannot be held in solution by resins) and prevents drops joining. The effect of the surfactants can be counteracted by oil-soluble emulsion breakers/antifoam agents and asphalt dispersants. If necessary these can be injected continuously upstream of the separator.

It is also possible to connect additional valves to the inlet and outlets of the separator to regulate the inflow of well fluid and the outflow of the fluid components. The separator can also comprise other available equipment for monitoring/checking that its operating conditions are being met. It can for example comprise equipment for measuring the volume flow/speed/pressure/temperature of the fluid/fluid components.

What is claimed is:

1. A method for separating a fluid from a formation into several fluid components in a well, said method comprising:

feeding the fluid into one end of a mainly horizontal section of pipe or bore located in a down-hole, mainly horizontal section of the well;

setting the fluid to flow at a speed through a length of the mainly horizontal section of pipe or bore such that the fluid components are separated and a boundary layer is formed between the fluid components, whereby fluid components with a lower density are formed in a top part of the mainly horizontal section of pipe or bore and fluid components with a higher density are formed in a bottom part of the mainly horizontal section of pipe or bore; and removing the fluid components with the lower density and the fluid components with the higher density through separate outlets located at an opposite end of the mainly horizontal section of pipe or bore.

2. A method as claimed in claim 1, wherein said setting operation comprises regulating the speed of the fluid with restrictions placed upstream of the mainly horizontal section of pipe or bore.

3. A method as claimed in claim 1, wherein said setting operation comprises regulating a flow of the fluid components.

4. A method as claimed in claim 1, further comprising:

detecting a level of the boundary layer with measuring equipment; and setting the level of the boundary layer by regulating the flow of the fluid components which are removed from the mainly horizontal section of pipe or bore during said removing operation.

5. A method as claimed in claim 1, further comprising:

injecting the fluid components with the higher density back into the formation; and bringing the fluid components with the lower density to the surface.

6. A method as claimed in claim 1, further comprising:

passing the fluid components with the higher density through a further separation process to thereby separate out fluid components with a highest density;

injecting the fluid components with the highest density back into the formation; and bringing the fluid components with the lower density to the surface.

7. A device for separating a fluid from a formation into several fluid components in a well, said device comprising:

a mainly horizontal section of pipe or bore located in a mainly horizontal section of the well having an inlet for said fluid at one end of said pipe or bore and at least two outlets at an opposite end of said pipe or bore, wherein said mainly horizontal section of pipe or bore has a length that allows the fluid to separate into fluid components with a higher density and fluid components with a lower density while the fluid flows through said mainly horizontal section of pipe or bore such that the fluid components with the higher density form on a bottom part of said mainly horizontal section of pipe or bore and the fluid components with the lower density form on a top part of said mainly horizontal section of pipe or bore, thereby forming a boundary layer in between, wherein said outlets include and outlet for removing the higher density components and an outlet for removing the lower density components, for said pipe or bore.

8. A device as claimed in claim 7, wherein said mainly horizontal section of pipe or bore comprises:

an inner perforated pipe; and an outer pipe element, wherein said inner perforated pipe and said outer pipe define an annulus.

9. A device as claimed in claim 8, wherein said mainly horizontal section of pipe or bore has a flow area that is greater than a flow area at said inlet.

10. A device as claimed in claim 8, further comprising at least one insert operable to promote coalescence located within said mainly horizontal section of pipe or bore.

11. A device as claimed in claim 10, wherein said insert is a pierced disk with a cut located in its bottom portion.

12. A device as claimed in claim 8, further comprising regulation devices located downstream from said at least two outlets of said mainly horizontal section of pipe or bore, said regulation devices operable to regulate the outflow of each the fluid components from said mainly horizontal section of pipe or bore.

13. A device as claimed in claim 12, further comprising:

a detecting means for detecting a level of the boundary layer; and a signal-processing unit operable to control the regulation devices for the fluid components based on the detected level of the boundary layer.

14. A device as claimed in claim 8, wherein said outer pipe element is an expanded well hole.

15. A device as claimed in claim 7, wherein said mainly horizontal section of pipe or bore has a flow area that is greater than a flow area at said inlet.

16. A device as claimed in claim 15, further comprising regulation devices located downstream from said at least two outlets of said mainly horizontal section of pipe or bore, said regulation devices operable to regulate the outflow of each the fluid components from said mainly horizontal section of pipe or bore.

17. A device as claimed in claim 7, further comprising at least one insert operable to promote coalescence located within said mainly horizontal section of pipe or bore.

18. A device as claimed in claim 17, wherein said insert is a pierced disk with a cut located in its bottom portion.

19. A device as claimed in claim 17, further comprising:

a detecting means for detecting a level of the boundary layer; and a signal-processing unit operable to control the regulation devices for the fluid components based on the detected level of the boundary layer.

20. A device as claimed in claim 17, further comprising regulation devices located downstream from said at least two outlets of said mainly horizontal section of pipe or bore, said regulation devices operable to regulate the outflow of each the fluid components from said mainly horizontal section of pipe or bore.

21. A device as claimed in claim 20, further comprising:

a detecting means for detecting a level of the boundary layer; and a signal-processing unit operable to control the regulation devices for the fluid components based on the detected level of the boundary layer.

22. A device as claimed in claim 7, further comprising regulation devices located downstream from said at least two outlets of said mainly horizontal section of pipe or bore, said regulation devices operable to regulate the outflow of each of the fluid components from said mainly horizontal section of pipe or bore.

23. A device as claimed in claim 22, further comprising:

a detecting means for detecting a level of the boundary layer; and a signal-processing unit operable to control the regulation devices for the fluid components based on the detected level of the boundary layer.

* * * * *